United States Patent
Ryu et al.

(10) Patent No.: US 7,248,547 B2
(45) Date of Patent: Jul. 24, 2007

(54) DEFECT SIGNAL DETECTING APPARATUS FOR OPTICAL RECORDING/REPRODUCING APPARATUS AND DEFECT SIGNAL DETECTING METHOD THEREOF

(75) Inventors: Eun-jin Ryu, Suwon (KR); Jae-wook Lee, Ohsan (KR)

(73) Assignee: Samsung Electronics Co., Ltd., Kyunggi-do (KR)

( * ) Notice: Subject to any disclaimer, the term of this patent is extended or adjusted under 35 U.S.C. 154(b) by 553 days.

(21) Appl. No.: 10/680,154

(22) Filed: Oct. 8, 2003

(65) Prior Publication Data
US 2004/0145987 A1    Jul. 29, 2004

(30) Foreign Application Priority Data
Jan. 27, 2003 (KR) .................. 10-2003-0005361

(51) Int. Cl.
*G11B 7/00* (2006.01)
(52) U.S. Cl. .............. 369/47.14; 369/53.15; 369/53.34
(58) Field of Classification Search .......... 369/47.14, 369/53.15, 53.34
See application file for complete search history.

(56) References Cited

U.S. PATENT DOCUMENTS

| | | | |
|---|---|---|---|
| 5,587,985 A * | 12/1996 | Sano et al. ............ 369/124.02 |
| 5,680,383 A | 10/1997 | Clark et al. |
| 5,898,656 A * | 4/1999 | Takiguchi ............. 369/47.51 |
| 6,256,273 B1 | 7/2001 | Matsuda et al. |
| 6,269,062 B1 * | 7/2001 | Minemura et al. ..... 369/47.53 |
| 6,556,526 B1 * | 4/2003 | Lu et al. ............... 369/53.34 |
| 2002/0097644 A1 * | 7/2002 | Kadlec et al. ......... 369/44.29 |
| 2002/0105874 A1 * | 8/2002 | Matsumoto ............ 369/47.53 |

FOREIGN PATENT DOCUMENTS

| EP | 0 840 297 A2 | 5/1998 |
|---|---|---|
| WO | WO 99/28901 A2 | 6/1999 |

* cited by examiner

*Primary Examiner*—Wayne Young
*Assistant Examiner*—LaTanya Bibbins
(74) *Attorney, Agent, or Firm*—Sughrue Mion, PLLC

(57) ABSTRACT

A defect signal detecting apparatus for an optical recording/reproducing apparatus that includes a maximum value detecting unit for detecting a highest amplitude among signals input during a maximum value detection period as a maximum value, a minimum value detecting unit for detecting a lowest amplitude among signals input during a minimum value detection period as a minimum value, an asymmetry detecting unit for calculating an amount $\delta$ of asymmetry by detecting a maximum value $I_L^{max}$ and a minimum value $I_L^{min}$ of a signal $I_L$ having a maximum periodicity among the signal input, and a maximum value $I_S^{max}$ and a minimum value $I_S^{min}$ of a signal $I_S$ having a minimum periodicity among the signal input, and a defect determining unit for determining whether there is a defect in the signal input, using the maximum value, the minimum value and the amount $\delta$ of asymmetry.

10 Claims, 7 Drawing Sheets

DEFECT SIGNAL DETECTING APPARATUS FOR OPTICAL RECORDING/REPRODUCING APPARATUS AND DEFECT SIGNAL DETECTING METHOD THEREOF

BACKGROUND

This application is based on Korean Patent Application No. 2003-5361 filed on Jan. 27, 2003, the disclosure of which is incorporated herein by reference in its entirety.

1. Field of the Invention

The present invention relates to an optical recording and/or reproducing apparatus, and more particularly, it relates to a defect signal detecting apparatus that detects a defect signal in a signal reproduced from an optical recording medium and accordingly outputs a blank signal, and a defect signal detecting method thereof.

2. Description of the Related Art

Generally, an optical recording and/or reproducing apparatus reproduces data from an optical disc such as a compact disc (CD) or a digital versatile disc (DVD) by emitting a beam of light from a light source such as a laser onto a disc surface and converts the level of the light reflected from the disc surface into an electric signal. The electric signal is called "radio frequency" (RF), and the RF signal is decoded into a binary signal and used for the desired purposes through demodulating process.

Meanwhile, there are usually scratches and dust particles on the surface of the optical disc, and because of their presence, the RF signal may not be always detected at the constant amplitude with respect to the recorded mark. Further, theoretically, the data to be reproduced are arranged in successive order. But in reality, the data may be scattered to different portions of the disc, and in order to read the scattered data, in addition to successive reading in motion from the inner to the outer circumference of the optical disc, the pickup of the optical recording/reproducing apparatus also jumps to a predetermined distance. As a result, there is no output of the RF signal when the pickup is jumping.

Describing the above in greater detail, FIGS. 1A, 1B, 1C and 1D show defects in the reproduced signal, which occurs when: (A) the disc has fingerprints thereon; (B) the pickup jumps to another track during reproducing; (C) the disc has a scratch or a black dot thereon; and (D) the amplitude of the reproduced signal is lower than predetermined first threshold TH1 and predetermined second threshold TH2.

In order to detect the defects likes the ones shown in FIGS. 1A, 1B, 1C and 1D, there is provided a defect signal detecting apparatus for detecting a defect signal, i.e., detecting the abnormal RF signal in the reproduced signal. When the defect signal detecting apparatus detects the defect signal, it outputs a blank signal. The blank signal is then provided to a phase locked loop (PLL) (not shown) or to a binary data decoder, to be used to hold the PLL or temporarily stop the output of binary data.

Figure 1A:
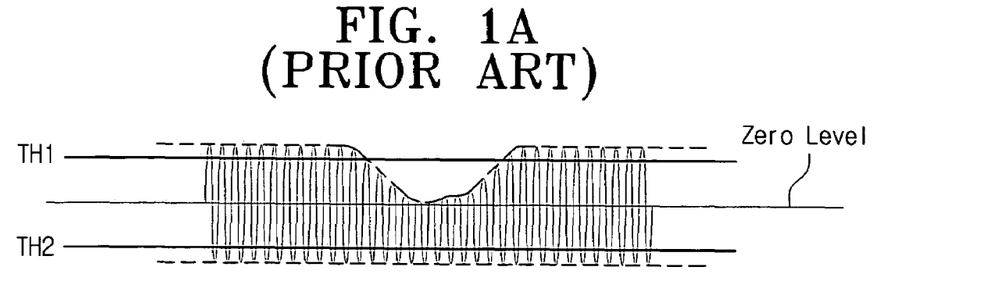
FIGS. 1A, 1B, 1C and 1D are views illustrating several examples of defect signals of reproduced signals.
Figure 1B:
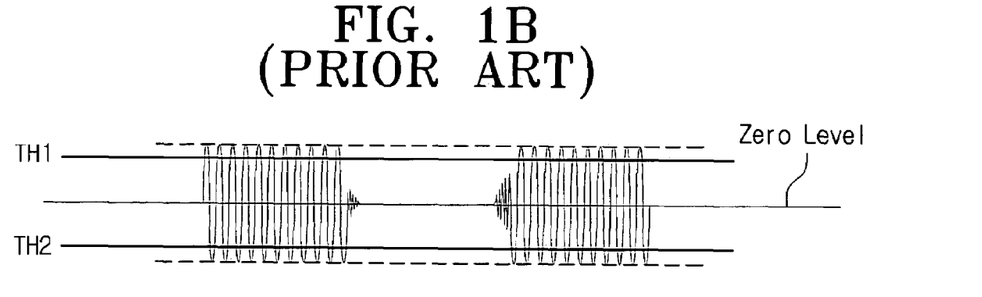
Figure 1C:
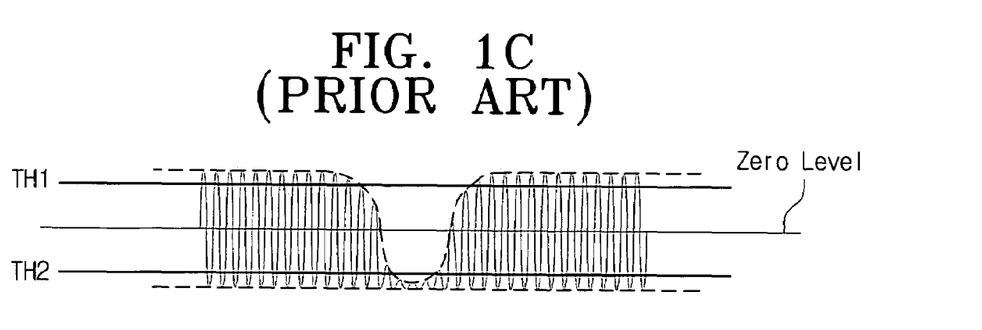
Figure 1D:
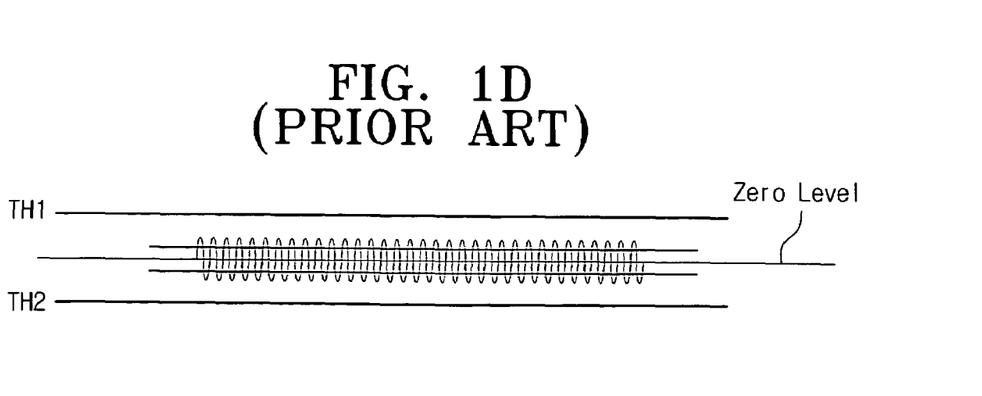
Figure 2:
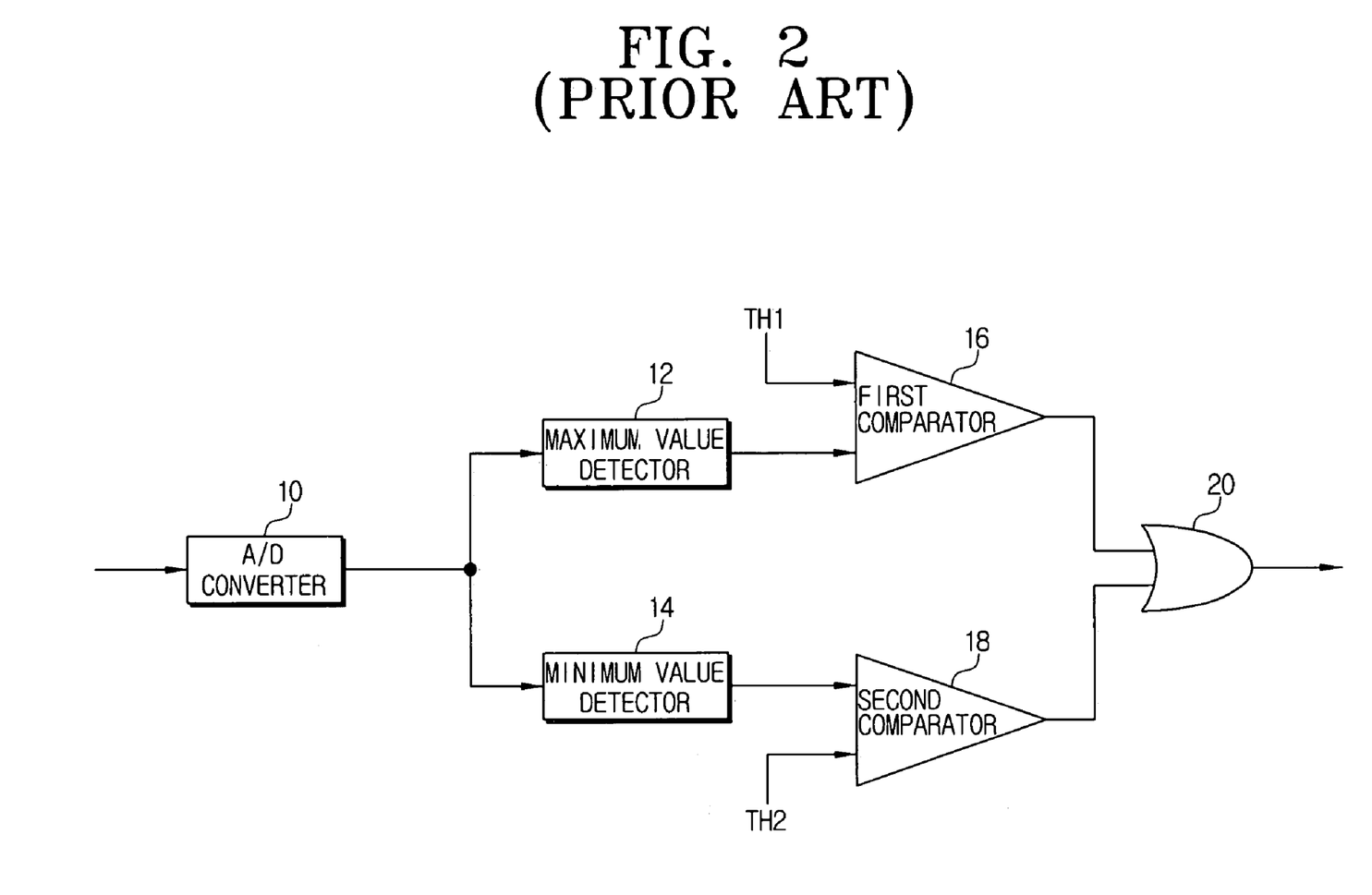
FIG. 2 is a block diagram of a conventional defect signal detecting apparatus of an optical recording/reproducing apparatus.

As shown in FIG. 2, in the conventional defect signal detecting apparatus, the digitized signal output from an A/D converter 10 is input to a maximum value detector 12 and a minimum value detector 14, respectively. The maximum value detector 12 detects an upper value of the incoming RF signals, while the minimum value detector 14 detects a bottom value of the incoming RF signals. A first comparator COMP1 16 compares the upper value with a first threshold TH1, and a second comparator COMP2 18 compares the bottom value with a second threshold TH2. Accordingly, a logic circuit 20 outputs a defect signal according to the results of the comparisons at the first comparator COMP1 16 and the second comparator COMP2 18. That is, if it is determined by the comparison at the first comparator COMP1 16 that the upper value is lower than the first threshold TH1, and by the comparison at the second comparator COMP2 18 that the bottom value is higher than the second threshold TH2, the defect signal is output through the logic circuit 20.

However, the above-mentioned conventional defect signal detecting apparatus detects the normal reproduced signal to be the defect signal when:

(1) the normal reproduced signal is lower than the predetermined first and second thresholds TH1, TH2, (2) the normal reproduced signal is higher or lower than the predetermined first and second thresholds TH1, TH2 due to deviations occurring in the amplitude of RF signal during the pickup reading according to types of disc, drive or player in use, and (3) asymmetries are contained in the normal reproduced signal.

In the above cases, the defect signal detecting apparatus with the fixed thresholds TH1, TH2 detects a defect signal, while it is actually a normal reproduced signal, and accordingly outputs a blank signal.

SUMMARY

In order to solve the above and/or other problems, it is an aspect of the present invention to provide a defect signal detecting apparatus capable of accurately detecting a defect signal with respect to an input reproduced signal, and a detect method thereof.

In order to achieve the above aspects and/or other features of the present invention, there is provided a defect signal detecting apparatus for an optical recording/reproducing apparatus, including a maximum value detecting unit for detecting a highest amplitude among the signals input during a maximum value detection period as a maximum value based on a reference maximum value, a minimum value detecting unit for detecting a lowest amplitude among the signals input during a minimum value detection period as a minimum value based on a reference minimum value, an asymmetry detecting unit for calculating an amount δ of asymmetry by detecting a maximum value $I_L^{max}$ and a minimum value $I_L^{min}$ of a signal $I_L$ that has a maximum periodicity among the signals input, and by detecting a maximum value $I_S^{max}$ and a minimum value $I_S^{min}$ of a signal $I_S$ that has a minimum periodicity among the signals input, and a defect determining unit for determining whether there is a defect in the input signal, using the maximum value, the minimum value and the amount δ of asymmetry.

Further provided is a system controlling unit for providing the maximum value detecting unit and the minimum value detecting unit with the maximum value detection period and the minimum value detection period.

The amount δ of asymmetry is calculated at the asymmetry detecting unit by the equation, $$\delta = \frac{\frac{I_L^{max} + I_L^{min}}{2} - \frac{I_S^{max} + I_S^{min}}{2}}{I_L^{max} - I_L^{min}}.$$

The defect determining unit determines a defect signal and outputs a corresponding blank signal if the ratio of the maximum value to the minimum value is higher than 1+Δ−δ, or lower than 1−Δ−δ, where "Δ" is a margin of the ratio of the maximum value to the minimum value, which is obtained through experiments.

The maximum value detected at the maximum value detecting unit is set to be a reference maximum value for the next maximum value detection period, and the minimum value detected at the minimum value detecting unit is set to be a reference minimum value for the next minimum value detection period.

According to the present invention, there is also provided a defect signal detecting method for an optical recording/reproducing apparatus, which includes the steps of: detecting a highest amplitude among the signals input during a maximum value detection period as a maximum value based on a reference maximum value, detecting a lowest amplitude among the signals input during a minimum value detection period as a minimum value based on a reference minimum value, calculating an amount δ of asymmetry by detecting a maximum value $I_L^{max}$ and a minimum value $I_L^{min}$ of a signal $I_L$ that has a maximum periodicity among the signals input, and by detecting a maximum value $I_S^{max}$ and a minimum value $I_S^{min}$ of a signal $I_S$ that has a minimum periodicity among the signals input, and determining whether there is a defect in the signals input, using the maximum value, the minimum value and the amount δ of asymmetry.

Further provided is the step in which the maximum value detection period and the minimum value detection period are provided to the maximum value detecting unit and the minimum value detecting unit by a system controlling unit.

The amount δ of asymmetry is calculated at the asymmetry detecting unit by the equation, $$\delta = \frac{\frac{I_L^{max} + I_L^{min}}{2} - \frac{I_S^{max} + I_S^{min}}{2}}{I_L^{max} - I_L^{min}}.$$

The defect determining step determines a defect signal and outputs a corresponding blank signal if the ratio of the maximum value to the minimum value is higher than 1+Δ-δ, or lower than 1-Δ-δ, where "Δ" is a margin of the ratio of the maximum value to the minimum value, which is obtained through experiments.

The maximum value detected at the maximum value detecting unit is set to be a reference maximum value for the next maximum value detection period, and the minimum value detected at the minimum value detecting unit is set to be a reference minimum value for the next minimum value detection period.

As the defect signal of the signals input is determined using the ratio of the maximum value to the minimum value of the signals input, detection of a defect signal can be performed adaptively to the signals input.

BRIEF DESCRIPTION OF THE DRAWINGS

The above objects and other features of the present invention will become more apparent by describing in detail an illustrative, non-limiting embodiment thereof with reference to the attached drawings, in which.

DETAILED DESCRIPTION OF THE EXEMPLARY EMBODIMENTS

Hereinafter, the present invention will be described in detail with reference to the accompanying drawings.

Figure 3:
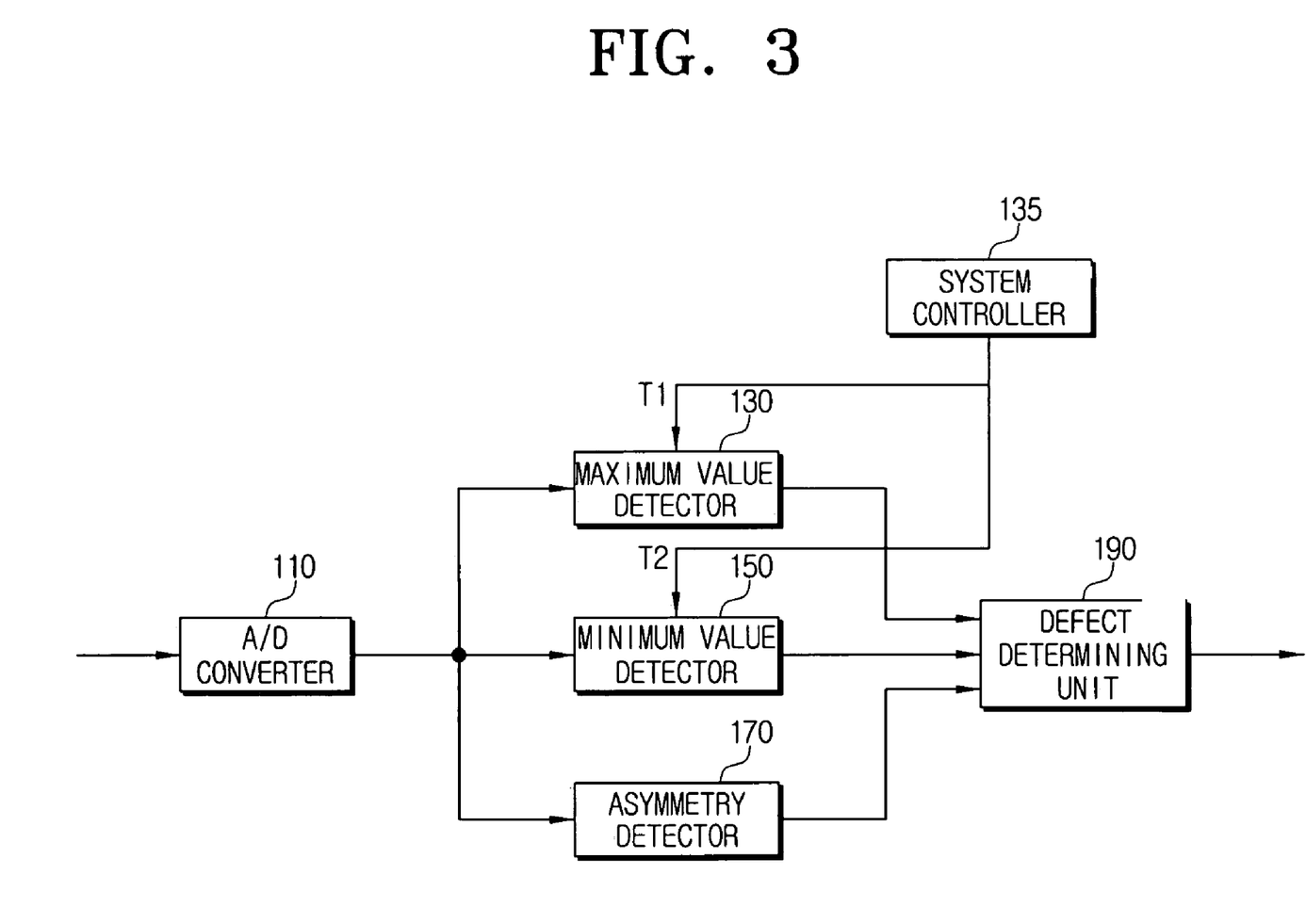
FIG. 3 is a block diagram illustrating a defect signal detecting apparatus of an optical recording/reproducing apparatus according to the present invention.
Figure 4:
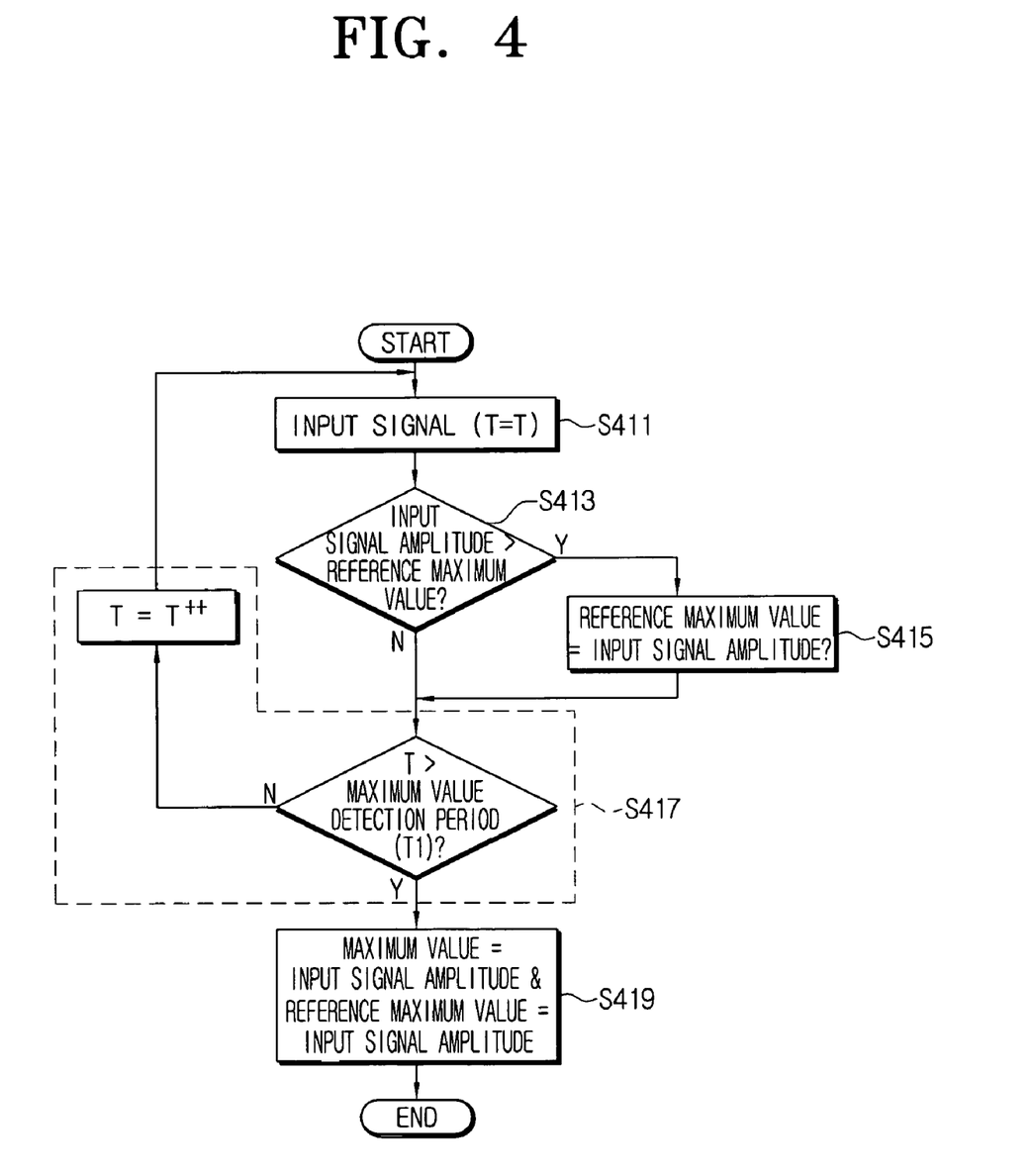
FIG. 4 is a flowchart illustrating the operation of a maximum value detector of the defect signal detecting apparatus of FIG. 3.
Figure 5:
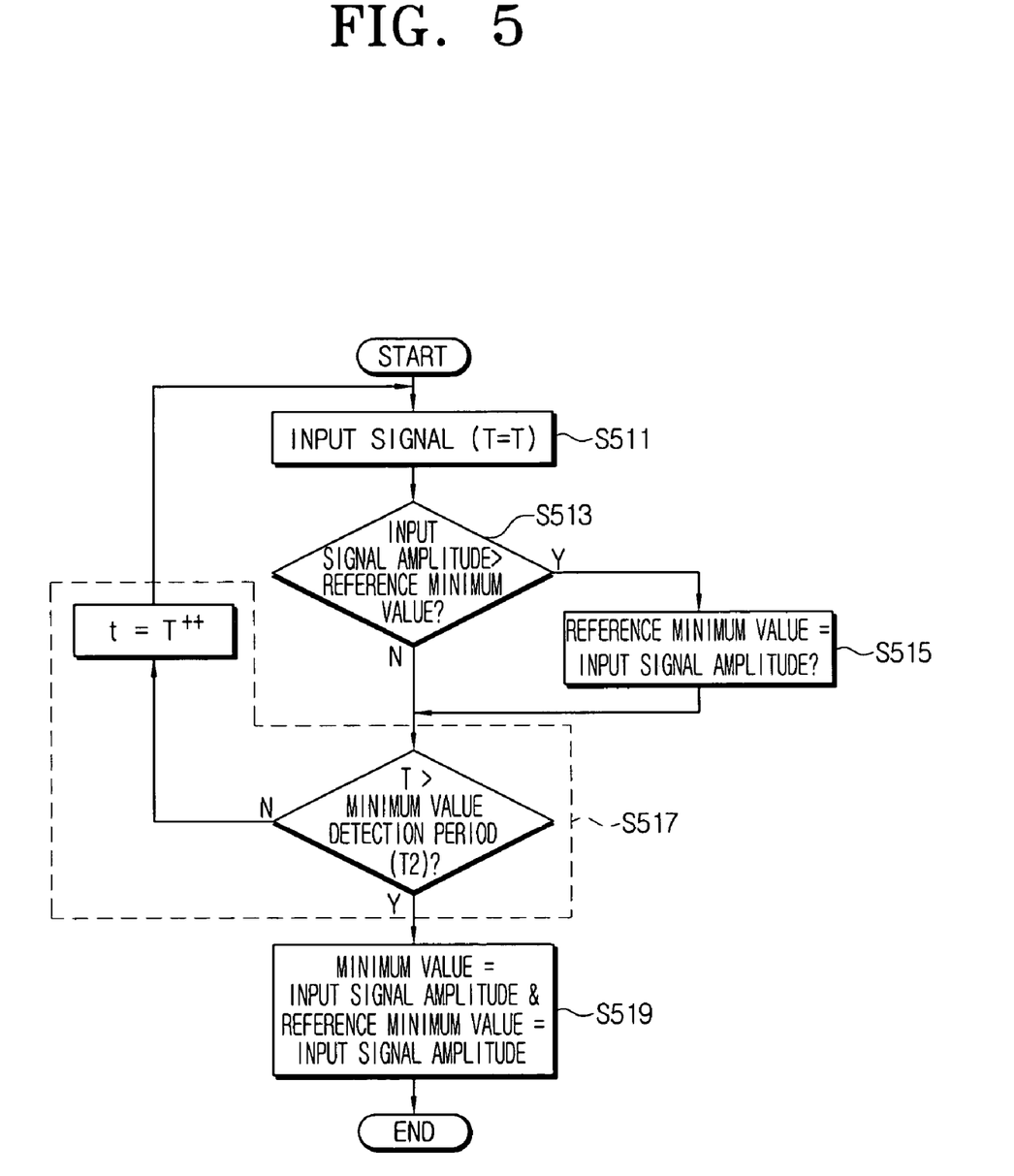
FIG. 5 is a flowchart illustrating the operation of a minimum value detector of the defect signal detecting apparatus of FIG. 3.
Figure 6:
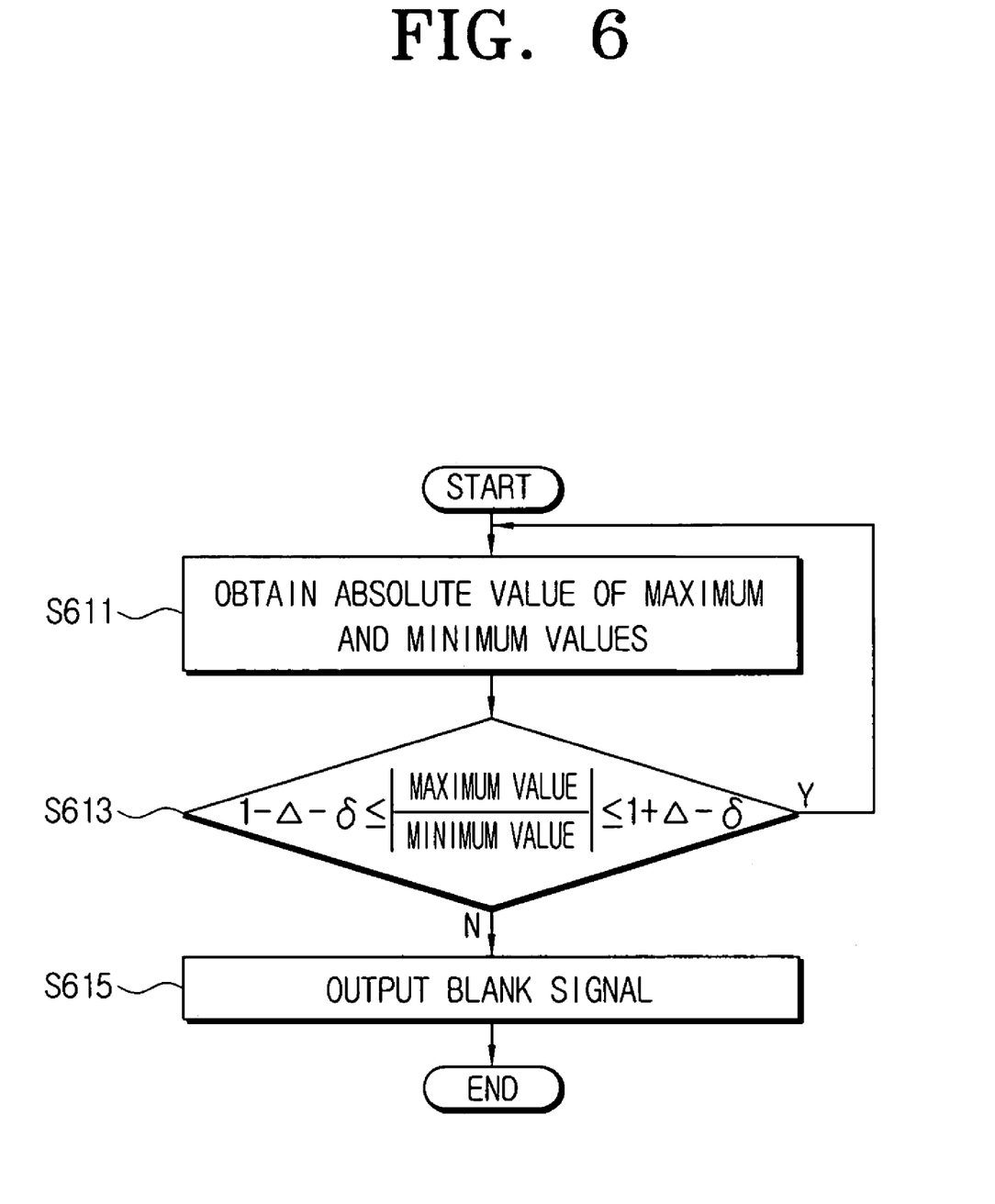
FIG. 6 is a flowchart illustrating the operation of a defect determining unit of the defect signal detecting apparatus of FIG. 3.

FIG. 3 is a schematic block diagram of a defect signal detecting apparatus of an optical recording/reproducing apparatus, which detects a defect in the signals of reproduced data from an optical recording medium, and FIGS. 4 to 6 are flowcharts illustrating the operations of the respective parts of the defect signal detecting apparatus.

The defect signal detecting apparatus according to an illustrative, non-limiting embodiment includes an A/D converter 110, a maximum value detector 130, a minimum value detector 150, an asymmetry detector 170 and a defect determining unit 190.

The A/D converter 110 samples various RF signals read by an optical pickup (not shown) to output in digital format.

The maximum value detector 130 detects a maximum value (max) of the signal input in the maximum value detection period T1 based on a predetermined reference maximum value, outputs the detected maximum value (max), and sets the detected maximum value to be the reference maximum value in the next maximum value detection period. That is, referring to FIG. 4, first, the reproduced signal is input (S411). Next, the input signal amplitude is compared with the reference maximum value (S413), and if the input signal is higher, the input signal amplitude is set as the reference maximum value (S415). The steps S411, S413 and S415 repeat during the maximum value detection period T1 (S417), and the maximum value (max) of the input signal amplitude is detected and output (S419).

The minimum value detector 150 detects a minimum value (min) of the signal input in the minimum value detection period T2 based on a predetermined reference minimum value, outputs the detected minimum value (min), and sets the detected minimum value to be the reference minimum value in the next minimum value detection period. That is, referring to FIG. 5, first, the reproduced signal is input (S511). Next, the input signal amplitude is compared with the reference minimum value (S513), and if the input signal is lower, the input signal amplitude is set as the reference minimum value (S515). The steps S511, S513 and S515 are repeated during the minimum value detection period T2 (S517), and the minimum value (min) of the input signal amplitude is detected and output (S519).

Initially, the first reference maximum/minimum values are provided by a system controller 135 of the optical recording/reproducing apparatus, and the system controller 135 generally generates various signals for detecting defects from a microcomputer or other programmable digital circuits. For example, the system controller 135 generates the maximum value detection period T1 and the minimum value detection period T2 and provides the maximum value detector 130 and the minimum detector 150 with the same, respectively.

The asymmetry detector 170 detects asymmetries of the input signals. More specifically, the asymmetry detector 170 calculates the amount δ of asymmetry in accordance with the rise and fall of the envelope of input signals with respect to the zero level. The asymmetry amount is expressed as equation 1.

$$\delta = \frac{\frac{I_L^{max} + I_L^{min}}{2} - \frac{I_S^{max} + I_S^{min}}{2}}{I_L^{max} - I_L^{min}}$$  [Equation 1]

where, $I_L^{max}$, $I_L^{min}$ are maximum and minimum values of a signal $I_L$ that has a maximum periodicity, and $I_S^{max}$, $I_S^{min}$ are maximum and minimum values of a signal $I_S$ that has a minimum periodicity.

The defect determining unit 190 determines whether there is a defect signal or not, with the maximum value, the minimum value and the asymmetry amount δ respectively obtained at the maximum value detector 130, the minimum value detector 150 and the asymmetry detector 170. Because the allowance range of the defect determining unit 190 is automatically adjusted in accordance with the calculated asymmetry amount δ, the asymmetry of input signals can be dealt with efficiently.

The defect signal refers to: i) asymmetric waves of an envelope with respect to the zero level; ii) signals of very low amplitude; and iii) blank signals due to track jumping.

FIG. 6 shows the step (S611) of obtaining an absolute value of the maximum value (max) and the minimum value (min) which are input from the maximum value detector 130 and the minimum value detector 150, respectively. If the ratio of the maximum value (max) to the minimum value (min) is higher than 1+Δ−δ, or lower than 1−Δ−δ (S613), it is determined as the defect signal and thus a blank signal is output (S615). "Δ" is a margin of the ratio of the maximum value (max) to the minimum value (min), which is obtained through experiments, and may vary depending on the type of the optical recording medium.

Accordingly, by using the ratio of the maximum value (max) to the minimum value (min), the undesired situation where the normal signal input of very low amplitude is detected as the defect signal can be prevented. Further, because the allowance ranges of ±Δ−δ with respect to the ratio of the maximum value (max) to the minimum value (min) are adjusted automatically in accordance with the asymmetry amount δ obtained at the asymmetry detector 170, defect detection with respect to the signal with asymmetry can be carried out with higher accuracy.

Figure 7:
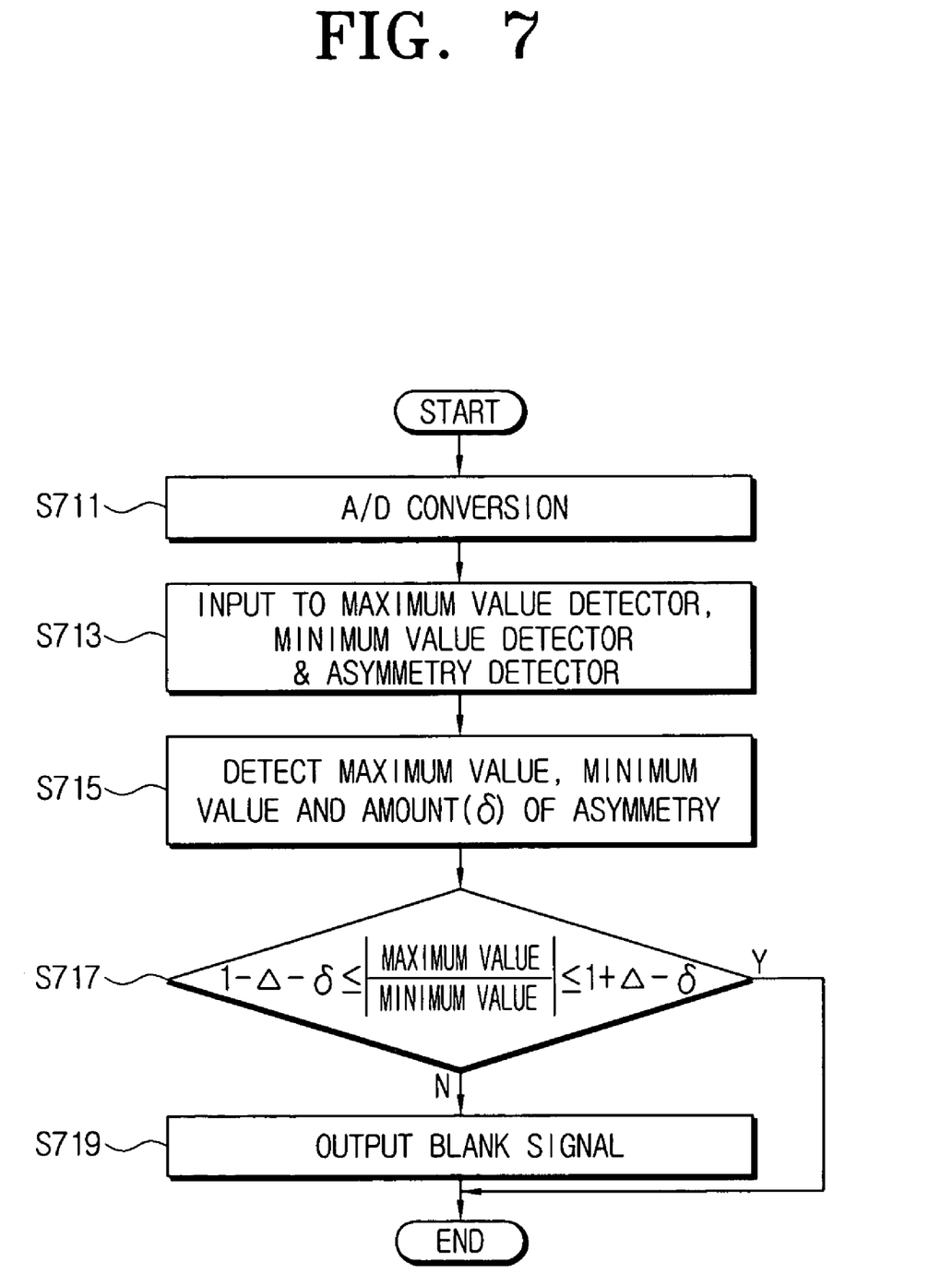
FIG. 7 is a flowchart illustrating the process in which a defect signal is detected and a blank signal is output by the defect signal detecting apparatus of FIG. 3.

Referring now to the flowchart of FIG. 7, the method for detecting a defect signal of the input signal with the defect signal detecting apparatus according to the present invention will be described below.

The reproduced signal, read from the optical recording medium through the pickup, is converted into a digital format through the A/D converter 110 (S711). The digitized signal is input to the maximum value detector 130, the minimum value detector 150 and the asymmetry detector 170, respectively (S713).

With respect to the reproduced signal input during the maximum value detection period T1 and the minimum value detection period T2, the maximum value detector 130 detects the highest amplitude signal as the maximum value (max) and the minimum value detector 150 detects the lowest amplitude signal as the minimum value (min), using the maximum value detection period T1 and the minimum value detection period T2 and the initially-set reference maximum and minimum values provided from the system controller 135. The maximum and minimum values detected in the respective detection periods T1, T2 are respectively set to be the reference maximum and minimum values for the next detection periods.

Meanwhile, among the incoming reproducing signals, the asymmetry detector 170 detects the maximum and minimum values $I_L^{max}$, $I_L^{min}$ of a signal $I_L$ that has a maximum periodicity, and also detects the maximum and minimum values $I_S^{max}$, $I_S^{min}$ of a signal $I_S$ that has a minimum periodicity, and calculates an asymmetry amount according to equation 1.

The defect determining unit 190 determines whether there is a defect in the incoming reproduced signal, using the maximum value (max), the minimum value (min) and the asymmetry amount δ respectively output from the maximum value detector 130, the minimum value detector 150 and the asymmetry detector 170 (S717).

Accordingly, if the ratio of the maximum value (max) to the minimum value (min) is higher than 1+Δ−δ, or lower than 1−Δ−δ, the defect signal is determined and thus, a blank signal is output. "Δ" is a margin of the ratio of the maximum value (max) to the minimum value (min), which is obtained through experiments, and may vary depending on the type of the optical recording medium.

If determining that there is the defect signal as a result of a defect determination, the defect determining unit 190 outputs a blank signal (S719).

As mentioned above, the conventional defect signal detecting apparatus determines even a normal signal as the defect signal in many occasions, for example, when the signal input is low in amplitude, or when there occurs a deviation of signal according to the product type of the disc in use, or when the signal contains asymmetry therein. According to the present invention, by adaptively responding to the signals input, the defect signal detecting apparatus can detect a defect signal more precisely, and as a result, the performance of the optical recording/reproducing apparatus improves.

According to the present invention, by determining the presence of a defect in the signals input based on the ratio of the maximum value to the minimum value of the signals input, detection of a defect signal can be carried out adaptively in accordance with the signals input.

Further, because the defect is detected in the allowance range of ±Δ−δ along with applying the asymmetry amount δ, detection of a defect signal can be adaptively carried out even with respect to the signals having asymmetry.

Although a few illustrative, non-limiting embodiments of the present invention have been described, it will be understood by those skilled in the art that the present invention should not be limited to the described exemplary embodiments, but various changes and modifications can be made within the spirit and scope of the present invention as defined by the appended claims.

What is claimed is:

1. A defect signal detecting apparatus for an optical recording/reproducing apparatus, comprising:

a maximum value detecting unit for detecting a highest amplitude among input signals during a maximum value detection period as a maximum value based on a reference maximum value;

a minimum value detecting unit for detecting a lowest amplitude among the input signals during a minimum value detection period as a minimum value based on a reference minimum value;

an asymmetry detecting unit for calculating an amount $\delta$ of asymmetry by detecting a maximum value $I_L^{max}$ and a minimum value $I_L^{min}$ of a signal $I_L$ that has a maximum periodicity among the input signals, and by detecting a maximum value $I_S^{max}$ and a minimum value $I_S^{min}$ of a signal $I_S$ that has a minimum periodicity among the input signals; and a defect determining unit for determining whether there is a defect in the input signals, using the maximum value, the minimum value and the amount $\delta$ of asymmetry, wherein the defect determining unit determines a defect signal and outputs a corresponding blank signal if a ratio of the maximum value to the minimum value is higher than $1+\Delta-\delta$, or lower than $1-\Delta-\delta$, where $\Delta$ is a margin of the ratio of the maximum value to the minimum value.

2. The defect signal detecting apparatus of claim 1, further comprising a system controlling unit for providing the maximum value detecting unit and the minimum value detecting unit with the maximum value detection period and the minimum value detection period.

3. The defect signal detecting apparatus of claim 1, wherein the amount $\delta$ of asymmetry is calculated at the asymmetry detecting unit by an equation, $$\delta = \frac{\frac{I_L^{max} + I_L^{min}}{2} - \frac{I_S^{max} + I_S^{min}}{2}}{I_L^{max} - I_L^{min}}.$$

4. The defect signal detecting apparatus of claim 1, wherein the maximum value detected at the maximum value detecting unit is set to be a reference maximum value for a next maximum value detection period, and the minimum value detected at the minimum value detecting unit is set to be a reference minimum value for a next minimum value detection period.

5. A defect signal detecting method for an optical recording/reproducing apparatus, comprising:

detecting a highest amplitude among input signals during a maximum value detection period as a maximum value based on a reference maximum value;

detecting a lowest amplitude among the input signals during a minimum value detection period as a minimum value based on a reference minimum value;

calculating an amount $\delta$ of asymmetry using a detected maximum value $I_L^{max}$ and a detected minimum value $I^{min}$ of a signal $I_L$ that has a maximum periodicity among the input signals, and using a detected maximum value $I_S^{max}$ and a detected minimum value $I_S^{min}$ of a signal $I_S$ that has a minimum periodicity among the input signals; and determining whether there is a defect among the input signals, using the maximum value, the minimum value and the amount $\delta$ of asymmetry, wherein the defect determining unit determines a defect signal and outputs a corresponding blank signal if a ratio of the maximum value to the minimum value is higher than $1+\Delta-\delta$, or lower than $1-\Delta-\delta$, where $\Delta$ is a margin of the ratio of the maximum value to the minimum value.

6. The defect signal detecting method of claim 5, further comprising determining the maximum value detection period and the minimum value detection period.

7. The defect signal detecting method of claim 5, wherein the amount of asymmetry is calculated by an equation, $$\delta = \frac{\frac{I_L^{max} + I_L^{min}}{2} - \frac{I_S^{max} + I_S^{min}}{2}}{I_L^{max} - I_L^{min}}.$$

8. The defect signal detecting method of claim 5, wherein the maximum value detected is set to be a reference maximum value for a next maximum value detection period, and the minimum value detected is set to be a reference minimum value for a next minimum value detection period.

9. A defect signal detecting apparatus for an optical recording/reproducing apparatus, the apparatus comprising:

a maximum value detecting unit for detecting a highest amplitude among input signals during a maximum value detection period as a maximum value based on a reference maximum value;

a minimum value detecting unit for detecting a lowest amplitude among the input signals during a minimum value detection period as a minimum value based on a reference minimum value;

an asymmetry detecting unit for calculating an amount of asymmetry based on the input signals; and a defect determining unit for determining whether there is a defect in the input signals, using the maximum value, the minimum value and the amount of asymmetry, wherein the defect determining unit determines a defect signal and outputs a corresponding blank signal if a ratio of the maximum value to the minimum value is higher than $1+\Delta-\delta$, or lower than $1-\Delta-\delta$, where $\Delta$ is a margin of the ratio of the maximum value to the minimum value.

10. A defect signal detecting method for an optical recording/reproducing apparatus, the method comprising:

detecting a highest amplitude among input signals during a maximum value detection period as a maximum value based on a reference maximum value;

detecting a lowest amplitude among the input signals during a minimum value detection period as a minimum value based on a reference minimum value;

calculating an amount of asymmetry based on the input signals; and determining whether there is a defect among the input signals, using the maximum value, the minimum value and the amount of asymmetry, wherein the defect determining unit determines a defect signal and outputs a corresponding blank signal if a ratio of the maximum value to the minimum value is higher than $1+\Delta-\delta$, or lower than $1-\Delta-\delta$, where $\Delta$ is a margin of the ratio of the maximum value to the minimum value.

* * * * *